Sept. 11, 1928.

F. LIOUD

CARBURETOR

Filed April 21, 1924    2 Sheets-Sheet 1

Witnesses
Jean Germain
Jean Maureau

Inventor
Frank Lioud

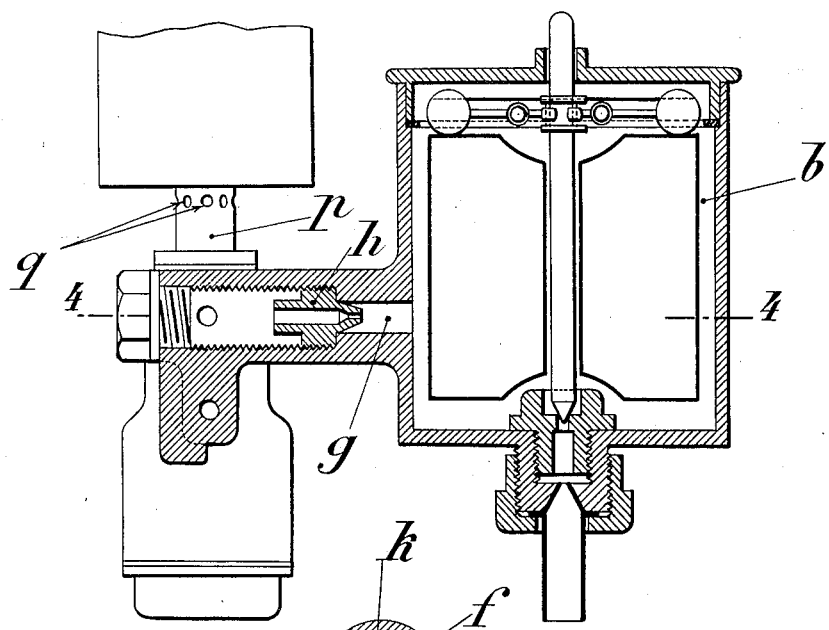
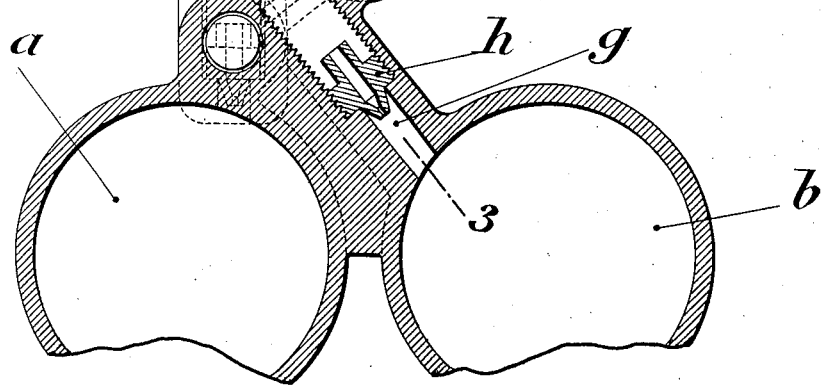

Patented Sept. 11, 1928.

1,684,355

UNITED STATES PATENT OFFICE.

FRANK LIOUD, OF ST. ETIENNE, FRANCE.

CARBURETOR.

Application filed April 21, 1924, Serial No. 708,012, and in France October 24, 1923.

This invention relates to a two fuel carburetor, one of which may be petrol or any light fuel and the other benzol, alcohol or a heavy fuel, or water. The carburetor operates in such a way that when starting the engine the light fuel only comes into use, and when running normally the two fuels come into action simultaneously but in a variable proportion according to the speed of the engine. The supply of the light fuel diminishes with the speed, while the supply of the water or heavy fuel increases; during pick-ups the fuels again come into simultaneous action but in this case the light fuel or volatile hydrocarbon predominates.

This automatic regulation of the proportions of the two fuels is obtained by utilizing the variations of suction, both in the mixing chamber of the carburetor and in the fuel tank of the carburetor, this being rendered possible by the provision of feed orifices of suitably calculated size and by a particular arrangement of the parts of the carburetor. The invention will be readily understood by referring to the accompanying drawings which represent, by way of example, a petrol and water carburetor. It is, however, understood that the invention is not restricted to the use of these liquids and that the petrol can be replaced by any light easily inflammable fuel, and the water can be replaced by any combustible or noncombustible liquid, acting either by the disassociation of its elements or by the utilization of its latent heat of vaporization.

Fig. 3 is a vertical section on line 3—3 of Fig. 4.

Fig. 4 is a horizontal section on line 4—4 of Fig. 3.

The carburetor comprises two constant level chambers $a$, $b$, the first containing petrol and the second the water. The chamber $a$ communicates by means of a conduit, in which there is a calibrated plug $c$, both with the petrol well $d$ and with a chamber $e$ into which leads a tube $f$ open at both ends.

The float chamber $b$ communicates by means of a conduit $g$ also provided with a calibrated plug $h$, with a second chamber $i$ separated from chamber $e$ by a plug $j$ and into which chamber $i$ leads a tube $k$ concentric with the tube $f$.

A third inner tube $l$ concentric with the tubes $k$, $f$ communicates with a lower chamber $m$ separated from the chamber $e$ by a plug $n$, and communicating with the atmosphere by means of a cock $o$.

Figure 1:
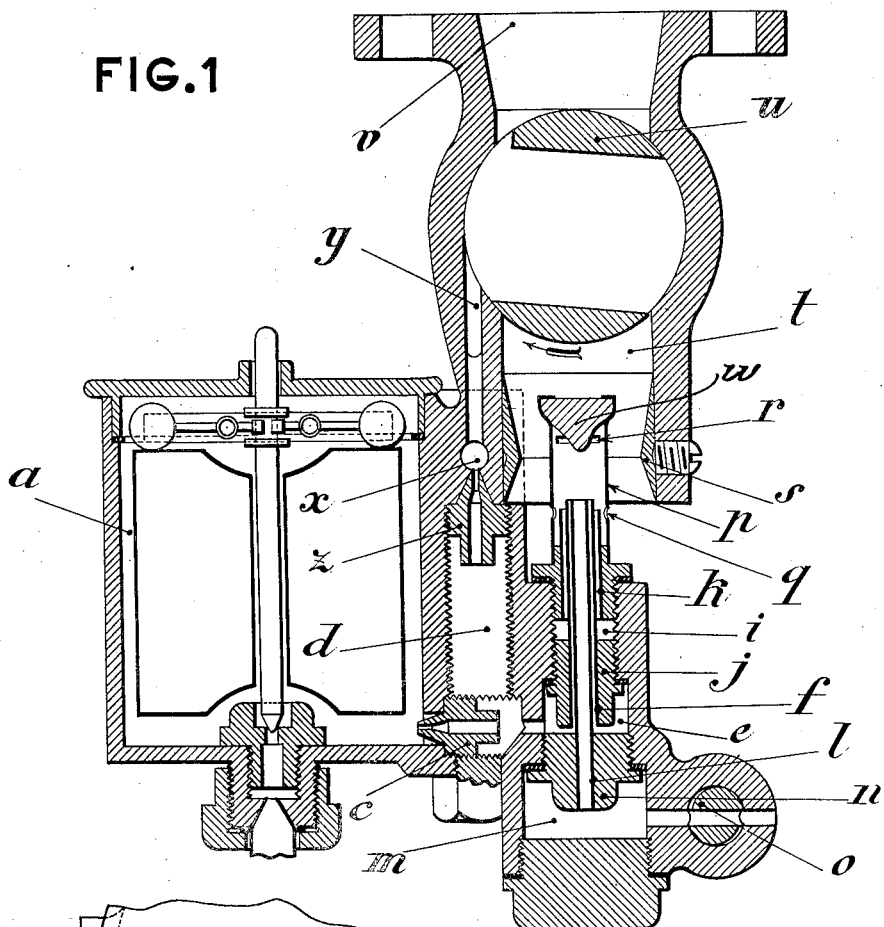
Fig. 1 is a vertical section of the carburetor taken on the line 1—1 of Fig. 2.
Figure 2:
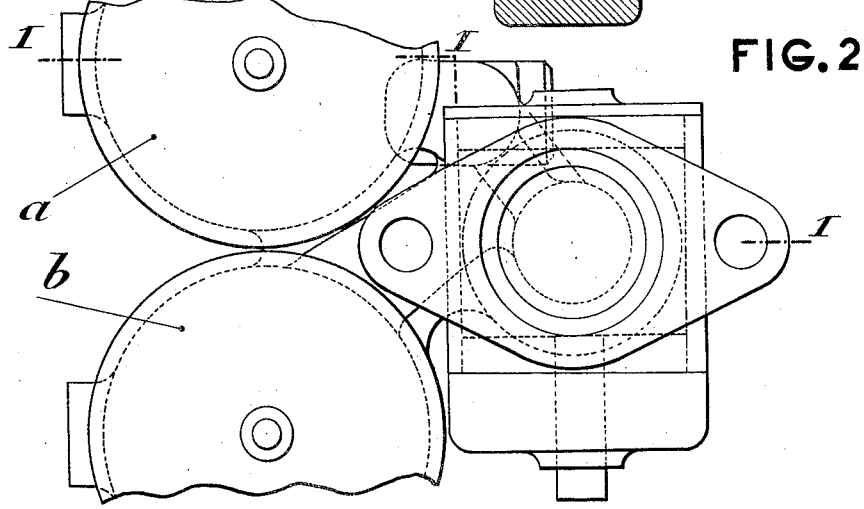
Fig. 2 is a plan thereof.

The three tubes $f$, $k$, $l$ open into a chamber $p$ provided at its base with adjustable air holes $q$, and towards the top with lateral slots $r$ which direct the explosive mixture against the wall of the choke $s$ where it is broken up before passing into the suction chamber $t$ of the carburetor. This latter comprises a boss in which is a rotary throttle $u$ and the arrangement of which is such that it allows communication either through the conduit $y$ between the suction pipe $v$, the fuel well $d$ and an air inlet $x$ (position shown in Fig. 1), or communication between the suction pipe $v$ and the chamber $t$.

The working of the carburetor is as follows:

At starting, the well $d$ is filled with petrol as well as the chamber $e$ and the space comprised between the tubes $f$ and $l$; the water fills the chamber $i$ and the space comprised between the tubes $f$ and $k$. The throttle $u$ being slightly turned the suction of the motor is exerted through the conduit $y$ in the well $d$, and a rich mixture of petrol and air which enters through $x$ is sucked up, which facilitates starting. This position is also that for slow speed running.

When the engine is well started the throttle $u$ is turned to shut off communication with the conduit $y$ and open communication with the chamber $t$. The suction produced in this latter also acts in the chamber $p$ upon the tubes containing the water, the petrol and eventually, the central air tube $l$ in proportion as the cock $o$ is opened. At this moment the delivery of petrol, which during normal running is regulated by the calibrated jet $c$, is increased owing to the reserve of petrol accumulated in the well $d$ during running at slow speed up to a level determined by the quantity of air admitted into this latter by the conduit $x$ and the calibrated orifice of the plug $z$. The petrol and the water sucked up simultaneously, pass through the orifices of their respective nozzles, into the chamber $p$ where a first intimate mixture takes place with the air entering through the holes $q$ and eventually through the conduit $l$; then the mixture meets the depending cone $w$ which deflects its path and causes it to pass out through the lateral holes $r$ along a path perpendicular to the axis of the diffusers whereby it is atomized against the wall of the diffuser and passes to the motor with the air sucked through the diffuser.

This position facilitates pick-ups, because the mixture is still sufficiently rich, owing to the additional feed of petrol due to the reserve accumulated in the well $d$.

When running normally the petrol is supplied through the calibrated orifice of plug $c$ direct to chamber $e$ and nozzle $f$ by the suction exerted by the engine. The feed of the water however increases with the suction, up to a definite limit. If the cock $o$ be opened the air which arrives through the central tube lessens still further the richness of the mixture and, consequently, the consumption of petrol, as the quantity of petrol remains the same for a greater amount of mixture sucked up. Thus a satisfactory and very economical supply of fuel is obtained for all rates of speed at which the motor or engine may be running. I am aware that prior to my invention carburetors have been constructed with a central air tube and two concentric outer tubes supplying fuel. Also that in a carburetor a compound nozzle for supplying different liquid fuels and a well for supplying fuel at idling speeds are known and I do not claim such features in themselves but it can be seen that the feed from the two concentric fuel tubes can be varied as required by opening cock $o$ more or less.

What I claim as my invention and desire to secure by Letters Patent of the United States is:—

A carburetor for two liquids, a lower, an intermediate and an upper chamber separated from one another the lower chamber being in communication with the bottom of a central air admission tube and provided with a valve for regulating the admission of air thereto, the intermediate chamber being in communication with the inner of two vertical annular liquid supply tubes and with a well adapted to hold a reserve of light liquid fuel fed through a submerged calibrated nozzle feeding in response to the suction of the engine acting in said well, said well communicating through a calibrated orifice with a conduit in connection with the suction pipe of the engine which pipe is provided with a suitable throttle, the upper of said chambers being in communication with the outer of said annular liquid supply tubes and fed with a second and different liquid, the delivery mouth of the inner annular tube being at a higher level than the delivery mouth of the outer annular tube so as to ensure the preponderance of the supply of light fuel during low speeds and an increase in the proportion of the second liquid at high speeds of the engine, the said mouths being freely enclosed in a cylindrical chamber situated on the axis of said suction pipe of the carburetor and provided with air admission orifices at the level of said second mouth and with mixture outlets above said mouths and opposite a depending conical member at the upper end of said chamber and adapted to deflect the flow of the mixture so that it flows through said mixture outlets perpendicular to the axis of said choke tube, all substantially as herein described.

In witness whereof I have signed this specification.

FRANK LIOUD.